United States Patent
Gao et al.

(10) Patent No.: US 9,462,599 B2
(45) Date of Patent: Oct. 4, 2016

(54) WIRELESS COMMUNICATION METHOD UTILIZING A LARGE-SCALE ANTENNA ARRAY

(71) Applicant: SOUTHEAST UNIVERSITY, Jiangsu (CN)

(72) Inventors: Xiqi Gao, Jiangsu (CN); Chen Sun, Jiangsu (CN); Shi Jin, Jiangsu (CN); Bin Jiang, Jiangsu (CN); Wen Zhong, Jiangsu (CN); Dongming Wang, Jiangsu (CN); Teer Ba, Jiangsu (CN)

(73) Assignee: SOUTHEAST UNIVERSITY (CN)

( * ) Notice: Subject to any disclaimer, the term of this patent is extended or adjusted under 35 U.S.C. 154(b) by 0 days.

(21) Appl. No.: 14/232,193

(22) PCT Filed: Apr. 19, 2013

(86) PCT No.: PCT/CN2013/074435
§ 371 (c)(1),
(2) Date: Jan. 10, 2014

(87) PCT Pub. No.: WO2014/059774
PCT Pub. Date: Apr. 24, 2014

(65) Prior Publication Data
US 2015/0334726 A1    Nov. 19, 2015

(30) Foreign Application Priority Data
Oct. 17, 2012    (CN) .......................... 2012 1 0394910

(51) Int. Cl.
*H04W 72/12*    (2009.01)
*H04L 5/00*    (2006.01)
(Continued)

(52) U.S. Cl.
CPC .............. *H04W 72/12* (2013.01); *H04B 7/04* (2013.01); *H04B 7/0617* (2013.01);
(Continued)

(58) Field of Classification Search
CPC ...... H04W 72/12; H04W 88/08; H04B 7/04; H04B 7/0617; H04L 5/0005; H04L 5/0007; H04L 5/0048
See application file for complete search history.

(56) References Cited

U.S. PATENT DOCUMENTS 9,048,917 B1 *   6/2015  Gomadam ............... H04B 1/10
2009/0268685 A1* 10/2009  Chen ..................... H04L 1/1854
                                                               370/329

(Continued)

FOREIGN PATENT DOCUMENTS

| CN | 101882952 | 10/2010 | ............... H04L 1/16 |
| CN | 102710309 | 3/2012 | ............... H04B 7/06 |
| CN | 102916735 | 6/2013 | ............... H04B 7/06 |

OTHER PUBLICATIONS

International Search Report issued in corresponding PCT Patent Appln. Serial No. PCT/CN2013/074435 dated Jul. 2, 2013 (5 pgs).
(Continued)

*Primary Examiner* — Paul H Masur
(74) *Attorney, Agent, or Firm* — Hayes Soloway P.C.

(57) ABSTRACT

A wireless communication method utilizes a large-scale antenna array, which is deployed at the base station and can be a one-dimensional or two-dimensional array and can form tens of beams over the area covered by the base station. The communications method utilizes beam domain division of spatial resources at the base station side utilizing an analog multi-beam forming network or a digital domain multi-beam forming method. The base station carries out wireless communication with multiple users with the same time frequency resource and with the communications process implemented in the beam domain. Scheduling is accomplished through the utilization of a deterministic unitary matrix to form beams. The unitary matrix is a correlation matrix of interference that includes a channel characteristics mode energy coupling matrix, the beam allocation providing beam sets of different users that are non-overlapping to distinguish users in the beam domain.

8 Claims, 4 Drawing Sheets (51) Int. Cl.
    *H04B 7/04*     (2006.01)
    *H04B 7/06*     (2006.01)
    *H04W 72/04*    (2009.01)
    *H04W 88/08*    (2009.01)
    *H04W 72/08*    (2009.01)

(52) U.S. Cl.
    CPC .......... *H04L 5/0005* (2013.01); *H04L 5/0007* (2013.01); *H04L 5/0048* (2013.01); *H04W 72/046* (2013.01); *H04W 72/085* (2013.01); *H04W 88/08* (2013.01)

(56) References Cited

U.S. PATENT DOCUMENTS

| | | | | |
|---|---|---|---|---|
| 2009/0279500 A1* | 11/2009 | Luo | H04L 5/0053 | 370/330 |
| 2010/0008331 A1* | 1/2010 | Li | H04L 5/0026 | 370/335 |
| 2010/0189189 A1* | 7/2010 | Hoshino | H04B 7/0408 | 375/267 |
| 2012/0020319 A1* | 1/2012 | Song | H04B 7/0632 | 370/330 |
| 2012/0027108 A1* | 2/2012 | Hong | H04B 7/024 | 375/260 |
| 2012/0177001 A1 | 7/2012 | Gao et al. | | 370/330 |
| 2013/0034040 A1* | 2/2013 | Priotti | H04B 7/0417 | 370/312 |
| 2013/0083770 A1* | 4/2013 | Kalhan | H04W 72/042 | 370/330 |
| 2013/0089068 A1* | 4/2013 | Kalhan | H04W 72/0446 | 370/330 |
| 2013/0130690 A1* | 5/2013 | Hunukumbure | H04W 36/22 | 455/436 |
| 2013/0272211 A1* | 10/2013 | Quan | H04B 7/0452 | 370/329 |
| 2013/0272263 A1* | 10/2013 | Pi | H04W 72/042 | 370/330 |
| 2013/0322280 A1* | 12/2013 | Pi | H04W 72/0413 | 370/252 |
| 2014/0044044 A1* | 2/2014 | Josiam | H04W 24/10 | 370/328 |
| 2016/0006122 A1* | 1/2016 | Seol | H04L 1/06 | 342/372 |

OTHER PUBLICATIONS

ZTE, Consideration on Multi-user beamforming, 3GPP TSG RAN WGI Meeting #56 R1-090636, Feb. 3, 2009 "2 MU scheme in TDD" (4 pgs).

* cited by examiner

WIRELESS COMMUNICATION METHOD UTILIZING A LARGE-SCALE ANTENNA ARRAY

CROSS REFERENCE TO RELATED APPLICATION

This application is a national stage entry under §371 of, and claims the benefit of, PCT/CN2013/074435, which itself claims priority to CN 2012/10394910.3, the entire disclosures of which is incorporated herein by reference.

FIELD OF THE INVENTION

The present invention relates to a wireless communication system utilizing multiple antennas, in particular to a multi-user SDMA (Space Division Multiple Access) wireless communication system that utilizes a large-scale antenna array.

BACKGROUND OF THE INVENTION

To meet the demand for extension of broadband information services to mobile terminals, the mobile communication system must support high speed grouped data transmission at a rate of hundreds of Mbps or even thousands of Mbps; under the situation that radio resources becomes tight increasingly, multi-antenna wireless transmission technology can improve spectral efficiency and power efficiency. Multi-antenna wireless transmission technology has become key technology in the 3GPP LTE (3rd Generation Partnership Project Long Term Evolution) for a new generation of mobile communication standard.

In a 3GPP LTE system, four antennas are used at the base station side. To further improve spectral efficiency and improve cell edge performance, in a high version LTE-Advanced system thereof, the number of antennas at the base station side has been increased to eight. Despite of that, the spectral efficiency and cell edge spectral efficiency achieved in a LTE system are still low, and the required transmitting power is still high. As the demand for broadband mobile communication further increases and green wireless communication is expected, it is necessary to exploit new techniques that can utilize radio resources in spatial dimensions thoroughly, so as to further significantly improve spectral efficiency and power efficiency of radio resources and meet the demand for green broadband mobile communication. To that end, the present invention provides a wireless communication technique that utilizes a large-scale antenna array.

SUMMARY OF THE INVENTION

Technical Problem

The object of the present invention is to provide a wireless communication method utilizing a large-scale antenna array, which can thoroughly exploit radio resources in spatial dimensions and support green broadband mobile communication.

Technical Scheme

The present invention provides a wireless communication method that utilizes the beam domain characteristics of wireless channels and large-scale antenna array to achieve high-efficiency wireless communication. The method comprises:

a. deploying a large-scale antenna array at the base station side for wireless communication, wherein, the antenna array is composed of tens of antenna units arranged at an interval at the magnitude of half wavelength, can be an one-dimensional or two-dimensional array, and can form tens of beam coverage over the area covered by the base station;

b. accomplishing beam domain division of spatial resources at the base station side with an analog multi-beam forming network or a digital domain multi-beam forming method, wherein, the base station carries out wireless communication with multiple users with the same time-frequency resource, and the communication process is implemented in the beam domain;

c. each user uses a different time-frequency resource to transmit detection signals; the base station obtains the beam domain long-time channel information of each user according to the received detection signals;

d. accomplishing user scheduling in the beam domain with the beam domain long-time channel information, to determine users that can communicate with the same time-frequency resource and allocate an corresponding beam set for each user;

e. Each user communicates with the base station on the selected beam set, wherein, the beam sets occupied by the users communicating with the same time-frequency resource have no overlap among them; in that way, multi-user SDMA transmission in the beam domain is achieved;

f. in the up links, the users communicating with the same time-frequency resource transmits pilot frequency signals and data signals simultaneously; and, the base station receives and deals with the data from the users on different beam sets; wherein, pilot frequency signals from different users don't have to be orthogonal to each other, and the pilot frequency can be reused among the space division users;

g. in the down links, the base station transmits signals simultaneously, including pilot frequency signals and data signals, to the users on selected beam sets with the same time-frequency resource; and, the users receives and deals with the data; wherein, pilot frequency signals for different users don't have to be orthogonal to each other, and the pilot frequency can be reused among the space division users.

In the large-scale antenna array, the antenna units are connected to a digital baseband processing unit for wireless communication via their sending-receiving RF unit, A-D/D-A converter unit, digital optical module, and optical fiber transmission channels, and large-scale beam coverage in the cell is implemented by digital domain multi-beam forming; alternatively, the large-scale antenna array can achieve large-scale beam coverage in the cell by means of an analog multi-beam forming network, and the beam domain sending-receiving signal ports can be connected to the digital baseband processing unit for wireless communication via A-D/D-A converter unit, digital optical module, and optical fiber transmission channels.

The wireless communication between the base station and the users is implemented in the beam domain; a beam domain digital baseband processing and control system at the base station side comprises modules like beam processing units, user processing units, exchange processing unit, and space division multi-user scheduling unit, etc. Each beam processing unit accomplishes transmission post-processing or reception pre-processing of one or more beams, each user processing unit accomplishes generation of frequency domain transmitted signals and processing of received signals of one or more users, the exchange processing unit accomplishes signal interaction between the beam processing units and the user processing units, and the space division multi-user scheduling unit accomplishes scheduling of space division multiple users.

The acquisition of said beam domain long-time channel information is accomplished in a channel detection process in the up links; in the up links, each user transmits detection signals intermittently, the detection signals from different users can be transmitted in an OFDM symbol in one time slot, different sub-carrier resources are used for the detection signals from different users, different antennas of each user transmit detection signals on different sub-carriers, the sub-carrier resources occupied by multiple antennae of each user are multiple sets of sub-carrier resources composed of adjacent sub-carriers, and each antenna uses sub-carriers with different numbers in these sub-carrier sets; on each beam of the base station, the beam domain channel parameters of each user are estimated according to the received detection signals, and thereby a channel characteristic mode energy coupling matrix (i.e., beam domain long-time channel information required for implementing multi-user space division scheduling) is calculated for each user.

The beam domain user scheduling is accomplished by a space division multi-user scheduling processing module at the base station side according to long-time channel information, i.e., the users in the cell are scheduled with the aforesaid obtained beam domain long-time channel information of each user on a criterion of maximizing system sum-rate, so as to determine the multiple users that can communicate with the same time-frequency resource and the beams to be used by each user; after the scheduling, the transmission beams of the communicated users have no overlap among them, and the users can carry out SDMA transmission in the beam domain; the user scheduling can be accomplished with a greedy algorithm or simplified greedy algorithm, i.e., all users and beams are traversed, with consideration of beams available to the current user in the remaining beam set and with consideration of the influence of the addition of the user into the selected user set on the system and rate performance, and the user that has the highest contribution to the increase of the system and rate is selected to be added into the selected user set.

The beam domain multi-user SDMA transmission utilizes the spatial angle resolution of the large-scale array antenna and the local characteristics of each user channel in the beam domain to differentiate users at different positions in different directions; different users use different beam sets to communicate with the base station with the same time-frequency resource, the beam sets have no overlap among the users, and the beams of each user don't exceed the limit of maximum beam; single-user MIMO links are formed between each user and associated multiple beam ports thereof; in the up links, the base station processes the received signals for the users on corresponding beam sets; in the down links, the base station transmits the signals for users on corresponding beam sets.

The up-link transmission process for the users involves pilot frequency training and data transmission. Each user transmits pilot frequency signals with the given time-frequency resource, the pilot frequency signals don't have to be orthogonal among different users, and can be reused; for the same user, the pilot frequency signals shall be orthogonal among different antennas; the base station utilizes the received pilot frequency signals on the corresponding beams of users in conjunction with the received data signals to estimate transient channel information and correlation matrix of interference, and thereby carries out coherent reception processing for the data signals. The down-link transmission process for each user involves pilot frequency training and data transmission. The base station transmits pilot frequency signals with the given time-frequency resource, the pilot frequency signals for each user are mapped to different beam sets for transmission; in addition, the pilot frequency signals don't have to be orthogonal among different users, and can be reused; for the same user, the pilot frequency signals shall be orthogonal among different beams; each user utilizes the received pilot frequency signals in conjunction with the received data signals to estimate transient channel information and correlation matrix of interference, and thereby carries out coherent reception processing for the data signals.

Beneficial Effects

The wireless communication method utilizing a large-scale antenna array provided in the present invention has the following advantages:
1. Each user communicates with the base station in the beam domain, which can be adaptive to the airspace locality of the wireless channels; thus, the power gain and multi-path diversity gain provided by the large-scale antenna array can be obtained, and therefore the power efficiency and transmission reliability can be improved.
2. The beam resources used by each user can be determined with the long-time user channel information in the beam domain, and multi-user SDMA transmission can be implemented with the same time-frequency resource; therefore, the spectral efficiency can be greatly improved, and the SDMA transmission is applicable to both TDD (Time Division Duplexing) system and FDD (Frequency Division Duplexing) system.
3. Multi-user MIMO links are divided into single-user MIMO links, and each user communicates with a few beams only; therefore, the order of complexity for implementation in the physical layer is greatly decreased.
4. The required long-time information of each user channel in the beam domain can be obtained by means of sparse detection signals, and the required transient channel information can be obtained by means of specific pilot frequency signals with the corresponding beam resource; therefore, the cost for obtaining channel information can be greatly reduced.
5. The system solution in which each user communicate with the base station in a large-scale beam domain is helpful for implementation of wireless positioning with high accuracy and can improve wireless communication security.

BRIEF DESCRIPTION OF THE DRAWINGS

To further illustrate the technical scheme in the examples of the present invention, hereunder the drawings for describing the examples or the prior art will be introduced briefly. Apparently, the drawings describe below only illustrate some examples of the present invention. Those skilled in the art can obtain drawings of other examples on the basis of these drawings without creative labor.

EMBODIMENTS

To make the person skilled in the art understand the technical scheme of the present invention better, hereunder the technical scheme in the examples of the present invention will be described clearly and completely with reference to the accompanying drawings. Apparently, the examples described below are only parts of the present invention, instead of all of the present invention. Those skilled in the art can obtain other embodiments without creative labor, on the basis of the examples provided here; however, all these examples shall be deemed as falling into the protected domain of the present invention.

Figure 1:
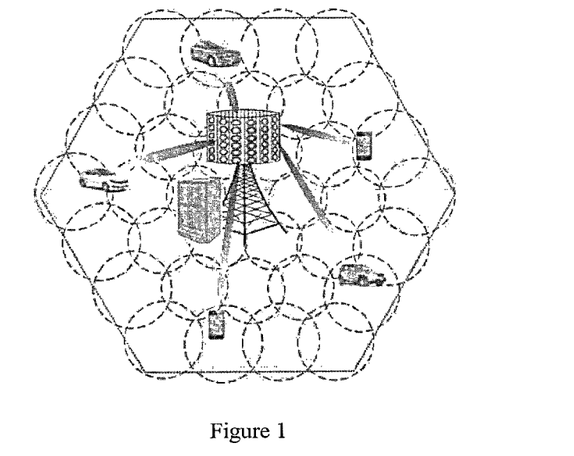
FIG. 1 is a schematic diagram of configuration and beam coverage of a large-scale antenna array at base station side.

(1) Large-Scale Antenna Array Configuration and Beam Coverage at Base Station Side FIG. 1 is a schematic diagram of configuration and beam coverage of a large-scale antenna array at base station side. The base station of a single cell is considered in the diagram. The large-scale antenna array of the base station is deployed on the building of the base station. The large-scale antenna array configured for a base station has a plurality of sectors, and each sector comprises a large quantity of antenna units. If the antenna units employ omni-antennae or 120° fan antennae, the interval between adjacent antenna units can be designed as $\frac{1}{2}\lambda$ or $1/\sqrt{3}\lambda$, where, $\lambda$ is carrier wavelength. Alternatively, the large-scale antenna array can be a circular array or in any other array structure that can create large-scale beam coverage and is easy to install.

In the large-scale antenna array, the antenna units are connected to a digital baseband processing unit via their sending-receiving RF unit, A-D/D-A converter unit, digital optical module and optical fiber transmission channels, and large-scale beam coverage in the cell is implemented by means of digital domain multi-beam forming. Alternatively, the large-scale antenna array can implement large-scale beam coverage in the cell by means of an analog multi-beam forming network, and the beam sending-receiving signal ports can be connected to the digital baseband processing unit via sending-receiving RF unit, A-D/D-A converter unit, digital optical module, and optical fiber transmission channels respectively. The large-scale beam coverage is illustrated with a large number of dotted line circles in FIG. 1. Different from the cell coverage in a conventional wireless communication system, the cell covered by the base station here is airspace sub-divided by means of a large number of beams, so as to fully exploit and utilize wireless resources in spatial dimensions.

(2) Composition of Base Station System

Figure 2:
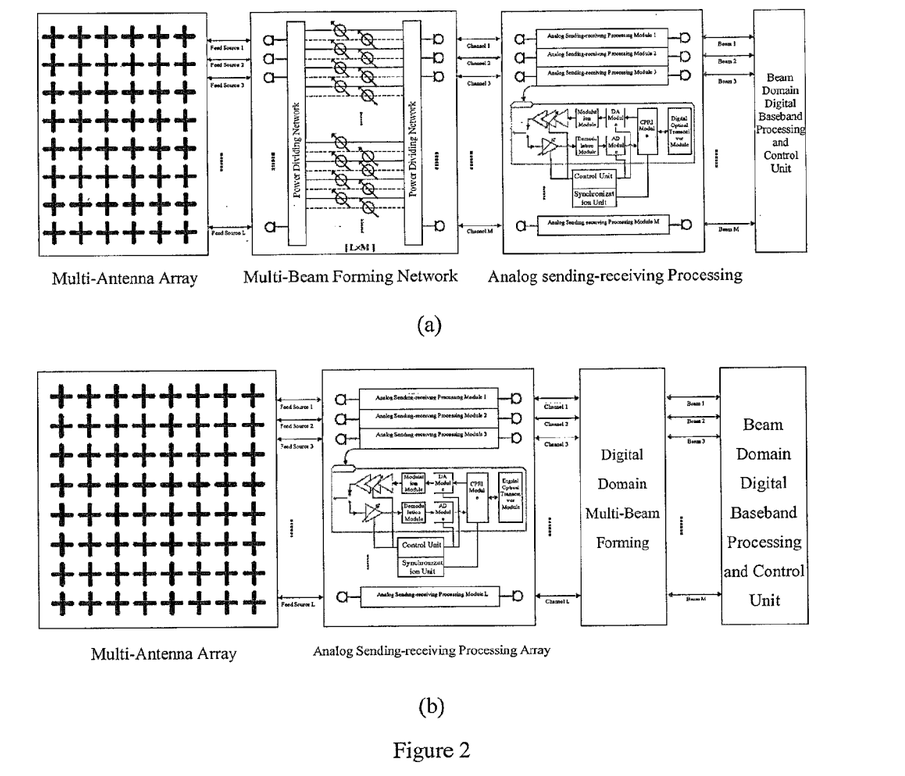
FIG. 2 shows schematic diagrams of the composition of a base station system: (a) schematic diagram of a base station system that utilizes an analog multi-beam forming network; (b) schematic diagram of a base station system that utilizes digital domain multi-beam forming.

FIG. 2(a) is a schematic diagram of composition of a base station system that utilizes an analog multi-beam forming network. The base station system comprises four parts: a one-dimensional or two-dimensional large-scale antenna array, an analog multi-beam forming network, an analog beam sending-receiving processing array, and a beam domain digital baseband processing and control unit. The large-scale antenna array can be arranged in different shapes, according to the quantity and requirement for easy installation. In the simplest form, the array can be a one-dimensional linear uniform antenna array; or, the array can be a two-dimensional square array or circular array. The multi-beam forming network mainly achieves transformation of spatial domain signals and beam domain signals, so that the antenna array can concentrate energy to transmit signals in different spatial directions or receive signals from different spatial directions; different beams correspond to different signal transmission and receiving directions and different beam coverage areas shown in FIG. 1, so as to achieve the purpose of differentiating users at different positions. The analog sending-receiving processing unit for each beam comprises carrier modulation/demodulation module, A-D/D-A converter module, and digital optical sending-receiving module, and all these modules are controlled by a control unit to switch on/off. During the process for the implementation of communication, the communication with users is accomplished with some beams, and a large number of beams are in idle state. Turning off the sending-receiving processing modules in idle state can reduce energy consumption.

FIG. 2(b) is a schematic diagram of composition of a base station system that utilizes digital domain multi-beam forming. The base station system comprises four parts: a one-dimensional or two-dimensional large-scale antenna array, an analog sending-receiving processing array, a digital domain multi-beam forming unit, and a beam domain digital baseband processing and control unit. Here, the analog multi-beam forming network shown in FIG. 2(a) is replaced with a digital domain multi-beam forming unit, to implement multi-beam forming in digital domain. With the antenna interval described above, digital-domain multi-beam forming can be implemented by means of DFT (Discrete Fourier Transform). Different from FIG. 2(a), the analog sending-receiving processing units here are not in one-to-one correspondence to the beam channels. During the process for the implementation of communication, the sending-receiving processing units can't be turned off according to the beam utilization condition.

Figure 3:
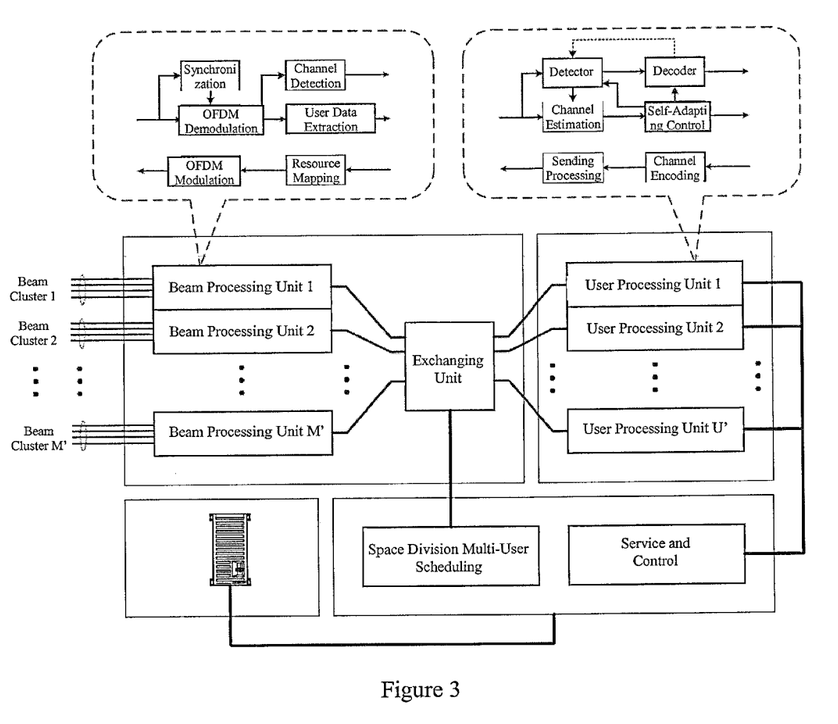
FIG. 3 is a schematic diagram of a beam domain digital baseband processing and control system.

FIG. 3 is a schematic diagram of a beam domain digital baseband processing and control system, which mainly comprises modules like beam processing unit, user processing unit, a switching processing unit, and a space division multi-user scheduling unit. Each beam processing unit accomplishes transmission post-processing or reception pre-processing of one or more beams, wherein, the transmission post-processing includes time-frequency resource mapping and OFDM (Orthogonal Frequency Division Multiplexing) modulation of signals transmitted by users on the corresponding beam; the reception pre-processing includes synchronization, OFDM demodulation, channel detection, and user signal extraction on the corresponding beams. The product of the number of beam processing units M' shown in FIG. 3 and the number of beams processed by each beam processing unit is the number of beams M in the system. Each user processing unit accomplishes generation of signals transmitted in frequency domain and processing of received signals for one or more users, wherein, the generation of transmitted signals includes transmission processing such as channel encoding and modulation of symbol mapping, etc.; the processing of received signals includes channel estimation, signal detection, channel decoding, and self-adapting link control, etc. The product of the number of use processing units U' shown in FIG. 3 and the number of users processed by each user processing unit is the number of users U in the cell. The switching unit accomplishes signal interaction between the beam processing units and the user processing units. The space division multi-user scheduling unit accomplishes scheduling of space division multi-users, selects the users that can communicate with the same time-frequency resource according to the statistic channel information obtained by channel detection, and allocates one or more corresponding beams for communication to each user.

(3) Acquisition of Beam Domain Long-Time Channel Information

The acquisition of beam domain long-time channel information is accomplished through a channel detection process in up links. In up links, each user transmits detection signals intermittently, the detection signals from all users can be transmitted in an OFDM symbol in a time slot, the detection signals from different users use different sub-carrier resources, different antennas of each user transmit detection signals on different sub-carriers, the sub-carrier resources occupied by multiple antennas of each user are multiple sets of sub-carrier resources composed of adjacent sub-carriers, and each antenna uses sub-carriers with different numbers in these sub-carrier sets. For each beam of the base station, the beam domain channel parameters are estimated for each user according to the received detection signals, and thereby the characteristic mode energy coupling matrix is calculated for each user channel. The characteristic mode energy coupling matrix is beam domain long-time channel information required for implementing multi-user space division scheduling.

Figure 4:
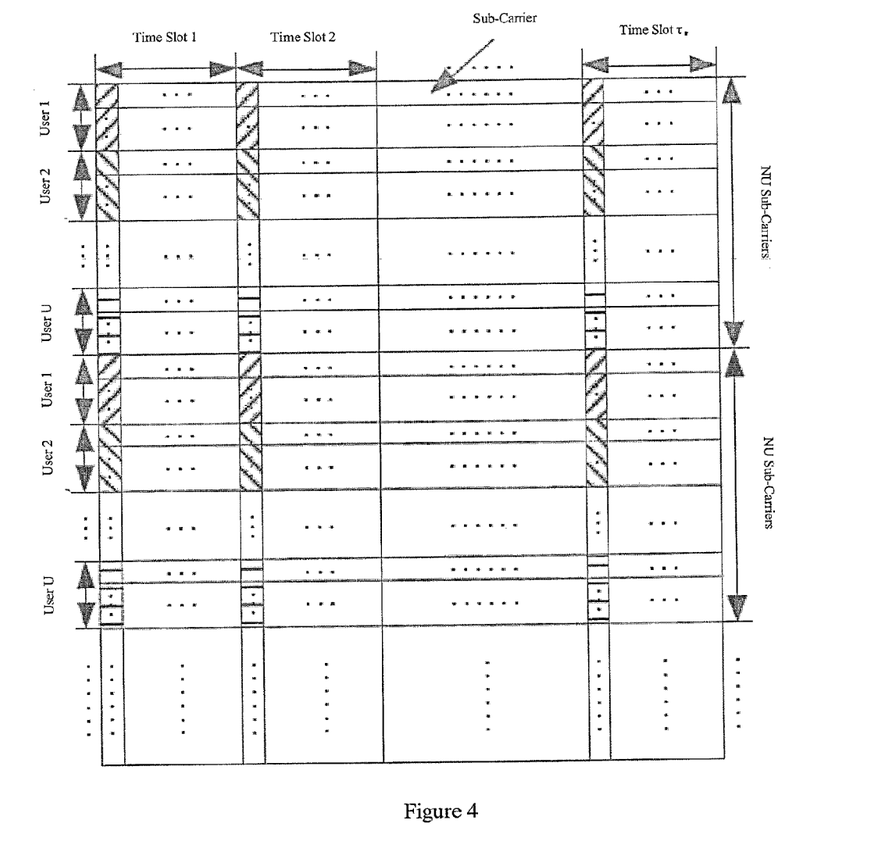
FIG. 4 is a schematic diagram of resource occupation for acquiring beam domain long-time channel information for each user.

FIG. 4 is a schematic diagram of resource occupation for acquiring beam domain long-time channel information for each user, wherein, the horizontal direction represents time, the vertical direction represents OFDM sub-carrier, and different slash shadows represent the time-frequency resources occupied for acquiring long-time channel information for different users. Here, the set of OFDM sub-carriers is denoted as K={1, 2, . . . , K}, the number of sending-receiving antennas configured for each user is denoted as N, the number of users in the cell is denoted as U, and the number of sub-carrier sets used by each user is denoted as $N_S$; and set $K = N_S N U$. The sub-carrier set occupied by the detection signals transmitted from antenna n of user u is $K_{u,n} = \{(u-1)N + n + (k-1)NU, 1 \leq k \leq N_S\}$, and the detection signal transmitted on sub-carrier k is denoted as $x_{u,n,k}$. The number of time slots in one statistic period is denoted as $\tau$, and the label is $t \in \{1, 2, \ldots, \tau\}$.

At the base station side, the characteristic mode energy coupling matrix of the up channel of each user is obtained through the following channel detection process:

Step 1: calculate the up-link channel parameters in beam domain for each user, wherein, the channel parameter of antenna n of user u on sub-carrier k in time slot t is calculated with the following formula:

$$\hat{g}_{u,n,t,k}^{up} = \frac{1}{x_{u,n,k}} y_{u,n,t,k} \quad (1)$$

Where, $y_{u,n,t,k}$ is the vector of received signals in the corresponding beam domain, and the element b is the received signal on beam b. The channel parameters of N antennas of user u form the following channel matrix:

$$\hat{G}_{u,t,k}^{up} = [\hat{g}_{u,1,t,k}^{up}, \hat{g}_{u,2,t,k}^{up}, \ldots, \hat{g}_{u,N,t,k}^{up}] \quad (2)$$

Step 2: calculate the transmitting correlation matrix of each user:

$$R_u^{ut} \approx \frac{1}{N_S \tau} \sum_{t=1}^{\tau} \sum_{k=1}^{N_S} (\hat{G}_{u,t,k}^{up})^H \hat{G}_{u,t,k}^{up} \quad (3)$$

Where, superscript H represents conjugate transposition.

Step 3: carry out Eigen-value decomposition for the transmitting correlation matrix for each user:

$$R_u^{ut} = B_u \Lambda_u V_u^H \quad (4)$$

to obtain the transmitting characteristic matrix $V_u$ of each user, where, $\Lambda_u$ is a diagonal matrix composed of the Eigen values.

Step 4: calculate the characteristic mode channel parameter matrix for each user:

$$H_{u,t,k}^{up} = G_{u,t,k}^{up} V_u \quad (5)$$

Step 5: calculate the characteristic mode energy coupling matrix of the up channel of each user:

$$\Omega_u^{up} \approx \frac{1}{N_S \tau} \sum_{t=1}^{\tau} \sum_{k=1}^{N_S} H_{u,t,k}^{up} \square (H_{u,t,k}^{up})^* \quad (6)$$

Where, $\square$ is the Hadamard product of the matrix, and the superscript * represents conjugation.

Obtain the characteristic mode energy coupling matrix $\Omega_u^{down} = [\Omega_u^{up}]^T$ of downlink channel of each user, by utilizing the reciprocity between statistic channel information of up link and statistic channel information of down link, where, the superscript T represents transposition.

(4) User Scheduling Algorithm

Schedule the users in the cell, with the beam domain long-time channel information of each user obtained with formula (3), on the basis of a given criterion, such as a criterion of maximizing system sum-rate, to determine the multiple users that can communicate with the same time-frequency resource and the beams used by each user; after the scheduling, the transmission beams have no overlap among the users. The users can carry out SDMA transmission in the beam domain.

The user scheduling problem can be accomplished with a greedy algorithm or simplified greedy algorithm. Based on the criterion of maximizing system sum-rate, on the premise of meeting the limit of beams number of each user and no overlap among the transmission beams of different users, traverse all users and beams, with consideration of beams available for the current user in the remaining beam set and the influence of addition of the user into the selected user set on the system performance, select the user that will make the highest contribution to the increase of system sum-rate and add the user into the selected user set; terminate the scheduling if the sum-rate decreases or when all users have been searched.

For example, suppose there are U users and M beams in a cell, the set of all users in the cell is denoted as $U \subseteq \{1, 2, \ldots, U\}$, the set of beams is denoted as $B=\{, 1, 2, \ldots, M\}$, the set of users selected for SDMA communication is denoted as $U_S\{u_1, u_2, \ldots, u_S\}$ (where, S represents the number of scheduled users), the set of unselected users is denoted as $U_n$, the beam set of user u is denoted as $B_u$, the free beam set is denoted as $B_n$, the system sum-rate when the users in the set $U_S$ use their corresponding beam set $B_u$ to communicate with the base station is denoted as $R(U_S, B_{n_1}, B_{n_2}, \ldots, B_{n_S})$, and the system sum-rate after a user i with the best transmission beam set is added into the selected user set is denoted as $R_{U_S,i}$. For the up link, suppose the power of frequency domain QAM modulation symbol transmitted by user u is $P_u^{up}$, and the noise variance in the received signals is $\sigma^2$, then the ratio of the power of modulation symbol of user u to the noise variance is and $\rho_u^{up}=P_u^{up}/\sigma^2$, and $R(U_S, B_{u_1}, B_{u_2}, \ldots, B_{n_S})$ can be obtained by the following approximate calculation:

$$R(U_s, B_{u_1}, B_{u_2}, \ldots, B_{u_s}) \approx \sum_{i=1}^{S} \log \frac{Per([I\Omega_{1,i}])}{Per([I\Omega_{2,i}])} \quad (7)$$

Where, Per (•) is matrix permanent, $\Omega_{1,i}=[\Theta_{i,1}, \ldots, \Theta_{i,i-1}, \Theta_{1,i}, \Theta_{i,i+1}, \ldots, \Theta_{i,S}]$, $\Omega_{2,i}=[\Theta_{i,1}, \ldots, \Theta_{i,i-1}, \Theta_{i,i+1}, \ldots, \Theta_{i,S}]$, and $$\Theta_{i,j} = \rho_{u_j}^{up}[\Omega_{u_j}]^{B_{u_i}}.$$

Alternatively, $R(U_S, B_{u_1}, B_{u_2}, \ldots, B_{u_S})$ can be obtained by the following approximate calculation:

$$R(U_s, B_{u_1}, B_{u_2}, \ldots, B_{u_s}) \approx \sum_{i \in U_s} \log \frac{\prod_{m \in B_i}\left[\sum_{j \in U_s} \rho_j^{up}\left(\sum_{n=1}^{N}[\Omega_j]_{mn}\right)+1\right]}{\prod_{m \in B_i}\left[\sum_{\substack{j \in U_s \\ j \neq i}} \rho_j^{up}\left(\sum_{n=1}^{N}[\Omega_j]_{mn}\right)+1\right]} \quad (8)$$

For the down link, suppose the power of frequency domain QAM modulation symbol transmitted by the base station for user u' is $P_{u'}^{down}$, and the noise variance in the received signals of user u is $\sigma_u^2$, then the ratio of the power of modulation symbol transmitted by the base station for user u' to the received noise variance of user u is $\rho_{u,u'}^{down}=P_{u'}^{down}/\sigma_u^2$, and can $R(U_S, B_{u_1}, B_{u_2}, \ldots, B_{u_S})$ be obtained by the following approximate calculation:

$$R(U_s, B_{u_1}, B_{u_2}, \ldots, B_{u_s}) \approx \sum_{i=1}^{S} \log \frac{Per([I\Omega_{3,i}])}{Per([I\Omega_{4,i}])} \quad (9)$$

Where $\Omega_{3,t}=[\Theta_{i,1}, \ldots, \Theta_{i,i-1}, \Theta_{i,1}, \Theta_{i,i+1}, \ldots, \Theta_{i,S}]$, $\Omega_{4,t}=[_{i,1}, \ldots, \Theta_{i,i-1}, \Theta_{i,i+1}, \ldots, \Theta_{t,S}]$, and $\Theta_{i,j}=\rho_{u_i,u_j}^{down}$ $([\Omega_{u_i}]B^{u_j})^T$. Alternatively, $R(U_S, B_{u_1}, B_{u_2}, \ldots, B_{u_S})$ can be obtained by the following approximate calculation:

$$R(U_s, B_{u_1}, B_{u_2}, \ldots, B_{u_s}) \approx \sum_{i \in U_s} \log \frac{\prod_{n=1}^{N}\left[\sum_{j \in U_s} \rho_{i,j}^{down}\left(\sum_{m \in B_j}[\Omega_i]_{mn}\right)+1\right]}{\prod_{n=1}^{N}\left[\sum_{\substack{j \in U_s \\ j \neq i}} \rho_{i,j}^{down}\left(\sum_{m \in B_j}[\Omega_i]_{mn}\right)+1\right]} \quad (10)$$

To obtain a user scheduling result that is consistent between up link and down link, the system sum-rate can be calculated as the sum of sum-rate of up link and sum-rate of down link, or a weighted sum of them.

With the criterion of maximizing system sum-rate and the above approximate calculation method, the user scheduling algorithm is described as follows:

1) Greedy Algorithm

Traverse all users in the cell in turn, select a beam set that can attain maximum rate for a user from the free beam set, and select user that can maximize system sum-rate from the remaining user set; if the system sum-rate increases when the user is added into the communication user set, add the user, and update the user set and beam set, and keep on traversing the remaining users; otherwise terminate the scheduling. The specific implementation steps of the algorithm are as follows:

Step 1: initialize user sets and beam sets, a user set for initial users selected for communication $U_S=\emptyset$, a remaining user set is $U_n=\{1, 2, \ldots U\}$, a free beam set is $B_n=\{1, 2, \ldots, M\}$, and the number of initial users S=0.

Step 2: For each user in the remaining user set $U_n$, select an optimal transmission beam set $B_i$ from the free beam set $B_n$ in a way that the system sum-rate is maximum after the user is added into the selected user set; the beam selection formula is:

$$B_i = \arg\max_{B_i \subseteq B_n} R(U_s \cup \{i\}, B_{u_1}, \ldots, B_{u_s}, B_i), i \in U_n \quad (11)$$

Step 3: calculate the system sum-rate after the users in the remaining user set $U_n$ are added into the selected user set with their optimal transmission beam set $B_i$ respectively:

$$R_{U_s,i}=R(U_s\cup\{i\},B_{u_1},\ldots,B_{u_s},B_i), i \in U_n \quad (12)$$

Select the users that enable maximum sum-rate.

$$j = \arg\max_{i \in U_n} R_{U_s,i} \quad (13)$$

Step 4: If the system sum-rate increases after the user is added, i.e., $R_{U_s,i}>R_{U_s}$, select that user, and update the user set and beam set: $U_s=U_s\cup\{j\}$, $U_n=U_n\setminus\{j\}$, $B_n=B_n\setminus B_j$, S=S+1, and return to step 2 to repeat the cycle; otherwise turn to step 5.

Step 5: terminate scheduling, the selected user set is $U_S$, the scheduled number of users is S, the beam set for user communication is Bi, $i \in U_S$.

2) Simplified Greedy Algorithm

Traverse each users in the cell, with consideration of the influence of addition of each user into the user scheduling set $U_S$ on the system performance; if the system sum-rate increases, select the user; otherwise, don't select the user. The implementation steps of the algorithm are as follows:

Step 1: initialize user set and beam set, initialize a user set for initial users selected for communication is $U_S=\emptyset$, a remaining user set is $U_n=\{1, 2, \ldots, U\}$, and a free beam set $B_n=\{1, 2, \ldots, M\}$, and the number of initial users is S=0; set u=1 and the maximum system sum-rate is $R_{max}=0$.

Step 2: select an optimal transmission beam $B_u$ for user u from the free beam set $B_n$ in a way that the system sum-rate is maximum after the user is added into the user scheduling set $U_S$; the beam selection formula is:

$$B_u = \arg\max_{B_u \subseteq B_n} R(U_s \cup \{u\}, B_{u_1}, \ldots, B_{u_s}, B_u) \quad (14)$$

Step 3: calculate the system sum-rate $S_{U_s,n}$ after the user is added into the user scheduling set $U_S$.

$$R_{U_s,u} = R(U_s \cup \{u\}, B_{u_1}, \ldots, B_{u_s}, B_u) \quad (15)$$

If $R_{U_s,u} > R_{max}$, select the user, and update the user set and beam set $U_s = U_s \cup \{u\}$, $B_n = B_n \setminus B_u$, S=S+1, u=u+1, and $R_{max} = R_{U_s,u}$; otherwise, don't select the user, and update u=u+1 only.

Step 4: If u≤U, return to step 2; otherwise, turn to step 5.

Step 5: terminate scheduling, the selected user set is $U_S$, the scheduled number of users is S, the beam set for user communication is Bi, i∈$U_S$.

(5) Multi-User SDMA Transmission in Beam Domain

After user scheduling, different users use different beam sets to communicate with the base station; the beams have no overlap among the users, i.e., $B_i \cap B_j = \emptyset$, i≠j; in addition, the beams of each user don't exceed the limit of maximum beam, i.e., $|B_i| \leq B_{max}$. Single-user MIMO links are formed between each user and the corresponding transmission beam set. In the up link, the base station only receives the signals from user i on beam $B_i$. In the down link, the base station transmits the signals of user i with beam set $B_i$. In that way, multi-user SDMA transmission in the beam domain with the same time-frequency resource is implemented.

Figure 5:
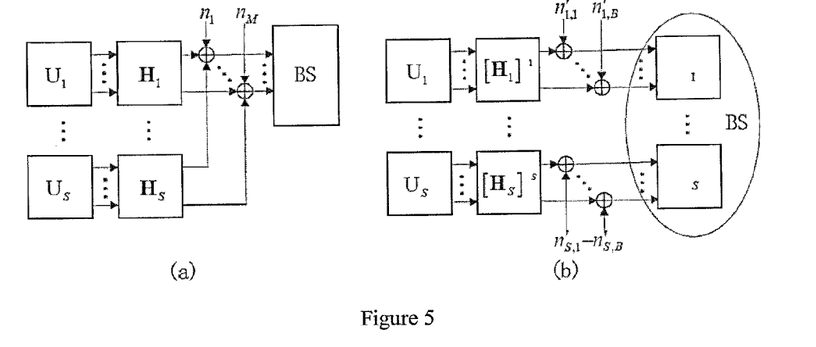
FIG. 5 shows comparison between the up-link transmission scheme and the conventional scheme: (a) transmission model of conventional MAC (Multiple Access Channel); (b) transmission model of the scheme in the present invention.

FIG. 5 shows the comparison between the up-link transmission and the conventional transmission scheme. FIG. 5(a) shows the model of conventional MAC channel transmission, wherein, the base station receives the superposed signals of all users in space domain, and the reception processing needs joint processing. As numbers of the users and sending-receiving antennas increase, the pilot frequency overhead and system complexity will increase significantly, and the channel information acquisition will be a bottleneck. FIG. 5(b) shows the up-link model of beam domain multi-user SDMA transmission scheme. Utilizing user separability in the beam domain, each user communicates with the base station on selected beams. The transmitted signals from each user include pilot frequency signals and data signals; pilot frequency signals from different users don't have to be orthogonal to each other. Thus, the bottleneck problem of channel information acquisition is solved, and the base station receives signals from different users on different beam sets; therefore, processing complexity is lower. The signals of user i received by the base station on beam set $B_i$ are:

$$y_i^{up} = \sqrt{P_i^{up}} [H_i^{up}]^{B_i} x_i^{up} + \sum_{j=1,j\neq i}^{S} \sqrt{P_j^{up}} [H_i^{up}]^{B_i} x_j^{up} + n_i \quad (16)$$

$$= \sqrt{P_i^{up}} [H_i^{up}]^{B_i} x_i^{up} + n_i'$$

Where, $x_i^{up}$ is the beam domain transmitted signals of user i, $p_i^{up}$ is the transmitting power, $n_i$ is Additive White Gaussian Noise (AWGN), and $n_i'$ is the sum of interfering signals of other users on the beam of the user and $n_i$. During detection and decoding for the user, the base station only utilizes the received signals $y_i^{up}$ on beam $B_i$, and doesn't need to utilize signals received on other beams.

Figure 6:
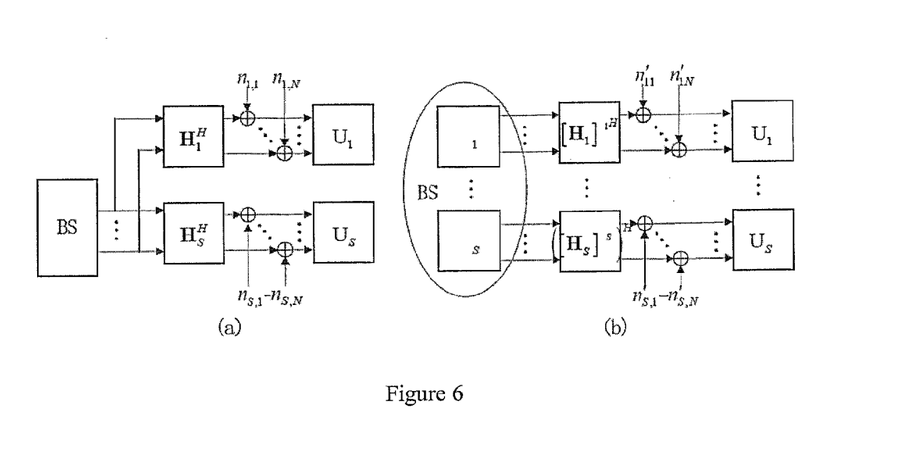
FIG. 6 shows comparison between the down-link transmission scheme and the conventional scheme: (a) transmission model of conventional BC (Broadcast Channel); (b) transmission model of the scheme in the present invention.

FIG. 6 shows the comparison between the down-link transmission and the conventional transmission scheme. The conventional BC channel transmission is shown in FIG. 6(a). The base station transmits superposed signals of all users, and the transmitting end usually has to know the transient channel status information. As the number of users and sending-receiving antennas increase, the channel information acquisition will become a bottleneck, and the transmission processing will be very complex. FIG. 6(b) shows the down-link model of beam domain multi-user SDMA transmission scheme. The base station transmits the signals for the users with the corresponding beam sets, which is to say, the beam set of each user is only used to transmit the signals for the user; the beam sets have no overlap among the users, and the complexity of transmission processing is lower; the pilot frequency signals of the users don't have to be orthogonal to each other; therefore, the bottleneck problem of down-link channel information acquisition is solved. The signals received by user i are:

$$y_i^{down} = \sqrt{P_i^{down}} [H_i^{down}]^{B_i} x_i^{down} + \sum_{j=1,j\neq i}^{S} \sqrt{P_j^{down}} [H_i^{down}]^{B_j} x_j^{down} + n_i \quad (17)$$

$$= \sqrt{P_i^{down}} [H_i^{down}]^{B_i} x_i^{down} + n_i'$$

Where, $x_i^{down}$ is the beam domain transmitted signals for user i, $P_i^{down}$ is the transmitting power, $n_i$ is AWGN, and $n_i'$ is the sum of the interfering signals of other users and $n_i$. During detection and decoding for the user, the received signals $y_i^{down}$ are used, while $n_i'$ is treated as color interference noise.

(6) Detailed Implementation Procedure of Up-Link Transmission

After user scheduling, the up-link transmission is equivalent to a plurality of single-user MIMO links. The scheduled users communicate with the base station with the same time-frequency resource. The entire transmission process comprises pilot frequency training and data transmission. The base station receives signals from the users on corresponding beams on the basis of the scheduling result, utilizes the received pilot frequency signals in conjunction with received data signals to estimate transient channel information and correlation matrix of interference, and utilizes the correlation matrix to carry out coherent reception processing for the data signals. The transmission process is described as follows:

1) In the up links, the users transmit pilot frequency training signals with the given time-frequency resource; the pilot frequency signals don't have to be orthogonal to each other among different users, and can be reused; however, pilot frequency signals of the same user among different antennas must be orthogonal.

2) The users transmit data signals with the time-frequency resource that is not pilot frequency.

3) On the basis of the user scheduling result, the base station carries out channel estimation for user u on beam $B_u$, to obtain transient channel information $[H_u^{up}]^{B_u}$ in the beam domain and a correlation matrix of interference $K_u^{up}=E\{n_u^{up}(n_u^{up})^H\}$.

4) The base station receives the signals $y_u^{up}$ from user u on beam $B_u$, carries out whitening treatment for the received signals with the correlation matrix of interference $K_u^{up}$, to obtain the received signals equivalent to white noise channel:

$$r_u^{up}=(K_u^{up})^{-1/2}y_u^{up} \quad (18)$$

The base station carries out coherent detection of transmitted signals $x_u^{up}$ with the transient information $(K_u^{up})^{-1/2}[H_u^{up}]^{B_u}$ of equivalent channel on beam $B_u$ and received signals $r_u^{up}$.

(7) Detailed Implementation Procedure of Down-Link Transmission

Likewise, the down link transmission is equivalent to a plurality of single-user MIMO links. The base station communicates with the scheduled users with the same time-frequency resource in the down link. The down-link transmission process comprises pilot frequency training and data transmission. The base station maps the pilot frequency signals and data signals for each user to the corresponding beam set for transmission; each user uses the received pilot frequency signals in conjunction with the received data signals to estimate transient channel information and correlation matrix of interference, and finally to carry out coherent reception processing. The transmission process is described as follows:

1) The base station transmits pilot frequency training signals with the given time-frequency resource, and maps the pilot frequency signals for different users to different beam sets for transmission; the pilot frequency signals don't have to be orthogonal among different users, and can be reused; however, the pilot frequency signals of the same user among different beams must be orthogonal.

2) The base station maps the data signals of each user to corresponding beams for transmission with the time-frequency resource that is not pilot frequency.

3) The user u uses the received pilot frequency signals in conjunction with the received data signals to estimate the channel $[H_u^{down}]^{B_u}$ on beam $B_u$, to obtain the transient channel information $[H_u^{down}]^{B_u}$ in the beam domain and correlation matrix of interference $K_u^{down}=E\{n_u^{down}(n_u^{down})^H\}$, 4) The user u receives signal $y_u^{down}$ and carries out whitening processing for the received signals with the correlation matrix of interference $K_u^{down}$, to obtain received signals equivalent to white noise channel, $$r_u^{down}=(K_u^{down})^{-1/2}y_u^{down} \quad (19)$$

The user carries out coherent detection of transmitted signals $x_u^{down}$ with the transient information $(K_u^{down})^{-1/2}[H_u^{down}]^{B_u}$ of equivalent channel on beam $B_u$ and received signal $r_u^{down}$.

The transmission scheme is applicable to FDD and TDD systems. In a FDD system, the up-link and down-link use different frequencies; therefore, the transient channel information of up-link is different from that of down-link, and channel information has to be estimated separately, i.e., transient channel information and correlation matrix of interference have to be estimated separately for up-link and down-link; in a TDD system, channel estimation can be carried out separately for up-link and down-link, or the pilot frequency signals can be transmitted in up-link or down-link only and the channel information of up-link and down-link can be obtained by utilizing the reciprocity between up-link and down-link; however, the interference in up-link is different from the interference in down link; therefore, the correlation matrix of interference has to be estimated separately for up-link and down-link.

In the examples of the present invention, it should be appreciated that the method disclosed can be implemented in other ways, without departing from the spirit and scope of the present invention. The examples provided here are only exemplary, and shall not be deemed as limitation to the present invention, and the content described shall not be deemed as limitation to the object of the present application. For example, a plurality of units or components can be combined or integrated into another system, or some features can be omitted, or excluded from the execution.

While the present invention has been illustrated and described with reference to some detailed embodiments, the present invention is not limited to these. Those skilled in the art should recognize that various variations and modifications can be made without departing from the spirit and scope of the present invention as defined by the accompanying claims. Therefore, the protected scope of the present invention shall be only confined by the claims.

The invention claimed is:

1. A wireless communication method utilizing a large-scale antenna array, comprising:
   a. deploying the large-scale antenna array at the base station side of a wireless communication network for wireless communication, wherein, the antenna array is composed of tens of antenna units arranged at an interval at a magnitude of half wavelength, the antenna array being one of a one-dimensional or two-dimensional array, the large-scale antenna array forming tens of coverage beams over an area covered by the base station;
   b. accomplishing beam domain division of spatial resources at the base station side with one of an analog multi-beam forming network or a digital domain multi-beam forming method, wherein, the base station carries out wireless communication with multiple users, and wherein the wireless communication includes a same time-frequency resource and a communications process, the communication process is being implemented in the beam domain;
   c. each user using a different time-frequency resource to transmit detection signals; the base station obtaining beam domain long-time channel information of each user according to received detection signals;
   d. accomplishing user scheduling in the beam domain utilizing the beam domain long-time channel information and a correlation matrix derived therefrom to provide an approximation of variance of interference, wherein the beam domain long-time channel information is calculated using a channel characteristics mode energy coupling matrix, the scheduling enabling users to communicate utilizing the same time-frequency resource and to allocate a corresponding beam set for each user;
   e. each user communicating with the base station on a selected beam set, wherein, the beam sets occupied by the users communicating with the same time-frequency resource have no overlap among them; such that multi-user SDMA transmission in the beam domain is achieved due to the use of the correlation matrix;

f. in the up links, the users communicating with the same time-frequency resource to transmit pilot frequency signals and data signals simultaneously; the base station receiving and dealing with the data from the users on different beam sets; wherein, pilot frequency signals from different users are not required to be orthogonal to each other, such that the pilot frequency is reusable among the space division users; and g. in down links, the base station transmitting signals simultaneously, including pilot frequency signals and data signals, to the users on selected beam sets with the same time-frequency resource; the users receiving and dealing with the data; wherein, pilot frequency signals for different users are not required to be orthogonal to each other, whereby the pilot frequency is reusable among the space division users.

2. The wireless communication method according to claim 1, wherein: in the large-scale antenna array, the antenna units are connected to a digital baseband processing unit for wireless communication via their sending-receiving RF unit, an A-D/D-A converter unit, a digital optical module, and optical fiber transmission channels, and wherein large-scale beam coverage in a cell is implemented by one of digital domain multi-beam forming or analog multi-beam forming, and wherein the beam domain sending-receiving signal ports are connected to the digital baseband processing unit for wireless communication via an A-D/D-A converter unit, a digital optical module, and optical fiber transmission channels.

3. The wireless communication method according to claim 1, wherein, the wireless communication between the base station and the users is implemented in the beam domain; wherein a beam domain digital baseband processing and control system at the base station side comprises modules including at least one of beam processing units, user processing units, an exchange processing unit, and a space division multi-user scheduling unit, each beam processing unit accomplishing transmission post-processing or reception pre-processing of one or more beams, each user processing unit accomplishing generation of frequency domain transmitted signals and processing of received signals of one or more users, the exchange processing unit accomplishing signal interaction between the beam processing units and the user processing units, and the space division multi-user scheduling unit accomplishing scheduling of space division multiple users.

4. The wireless communication method according to claim 1, wherein: the acquisition of said beam domain long-time channel information is accomplished in a channel detection process in the up links; in the up links, each user transmitting detection signals intermittently, the detection signals from different users transmitted in an OFDM symbol in one time slot, different sub-carrier resources being used for the detection signals from different users, different antennas of each user transmitting detection signals on different sub-carriers, the sub-carrier resources occupied by multiple antennae of each user being multiple sets of sub-carrier resources composed of adjacent sub-carriers, and each antenna using sub-carriers with different numbers in these sub-carrier sets; on each beam of the base station, the beam domain channel parameters of each user being estimated according to the received detection signals, such that said a channel characteristic mode energy coupling matrix formed from beam domain long-time channel information required for implementing multi-user space division scheduling is calculated for each user.

5. The wireless communication method according to claim 1, wherein: the beam domain user scheduling is accomplished by a space division multi-user scheduling processing module at the base station side according to long-time channel information such that the users in the cell are scheduled with the obtained beam domain long-time channel information of each user on a criterion of maximizing system sum-rate, so as to determine the multiple users that can communicate with the same time-frequency resource such that the beams to be used by each user; after the scheduling, have no overlap among them, the users carrying out SDMA transmission in the beam domain; the user scheduling accomplished by one of a greedy algorithm or simplified greedy algorithm, such that all users and beams are traversed, with consideration of beams available to the current user in the remaining beam set and with consideration of the influence of the addition of the user into the selected user set on the system and rate performance, the user having the highest contribution to an increase of the system and rate is selected to be added into the selected user set.

6. The wireless communication method according to claim 1, wherein: the beam domain multi-user SDMA transmission utilizes spatial angle resolution of the large-scale array antenna and local characteristics of each user channel in the beam domain to differentiate users at different positions in different directions; different users using different beam sets to communicate with the base station with the same time-frequency resource, the beam sets having no overlap among the users, and the beams of each user not exceeding a limit of maximum beam; single-user MIMO links formed between each user and associated multiple beam ports thereof; in the up links, the base station processing the received signals for the users on corresponding beam sets; in the down links, the base station transmitting the signals for users on corresponding beam sets.

7. The wireless communication method according to claim 1, wherein: the up link transmission process for the users involves pilot frequency training and data transmission and wherein each user transmits pilot frequency signals with the given time-frequency resource, the pilot frequency signals not required to be orthogonal among different users, such that the orthogonal signals are reusable; for the same user, the pilot frequency signals being orthogonal among different antennas; the base station utilizing the received pilot frequency signals on the corresponding beams of users in conjunction with the received data signals to estimate transient channel information and a correlation matrix of interference, thus to carry out coherent reception processing for the data signals.

8. The wireless communication method according to claim 1, wherein: the down link transmission process for each user involves pilot frequency training and data transmission; the base station transmitting pilot frequency signals with the given time-frequency resource, the pilot frequency signals for each user being mapped to different beam sets for transmission; the pilot frequency signals not required to be orthogonal among different users, such that the orthogonal signals are reusable; for the same user, the pilot frequency signals being orthogonal among different beams; each user utilizing the received pilot frequency signals in conjunction with the received data signals to estimate transient channel information and a correlation matrix of interference to carry out coherent reception processing for the data signals.

* * * * *